United States Patent [19]

Moore, III

[11] Patent Number: 4,989,390
[45] Date of Patent: Feb. 5, 1991

[54] FABRICATED STRUCTURAL TUBE

[76] Inventor: Eugene O. Moore, III, P.O. Box 2293, Jackson, Miss. 39225-2293

[21] Appl. No.: 320,921

[22] Filed: Mar. 8, 1989

Related U.S. Application Data

[63] Continuation of Ser. No. 45,560, May 4, 1987, abandoned.

[51] Int. Cl.$^5$ ............................................. E04C 3/32
[52] U.S. Cl. .................................................... 52/720
[58] Field of Search ................ 228/170, 173.1, 173.4; 403/174, 178, 219; 52/720, 731, 646, 648, 655, 656

[56] References Cited

U.S. PATENT DOCUMENTS

| | | | |
|---|---|---|---|
| 2,956,315 | 10/1960 | Lipp et al. | 52/731 |
| 3,394,525 | 7/1968 | McKee et al. | 52/731 |
| 3,498,654 | 3/1970 | Diaz et al. | 52/656 |
| 3,570,376 | 3/1971 | Overton, III | 52/731 |
| 3,827,206 | 8/1974 | Nierle | 52/648 |

FOREIGN PATENT DOCUMENTS

| | | | |
|---|---|---|---|
| 747235 | 6/1933 | France | 52/731 |
| 498806 | 9/1954 | Italy | 52/646 |
| 964083 | 10/1982 | U.S.S.R. | 52/648 |

*Primary Examiner*—Michael Safavi
*Attorney, Agent, or Firm*—Fleit, Jacobson, Cohn, Price, Holman & Stern

[57] ABSTRACT

A flat blank is folded into a tubular support having a parallelogram cross-section with planar side faces extending longitudinally between opposite ends at which the blank is cut and folded into end formations. Two or three of the tubular supports are interconnected at their end formations abutting in one or two abutment planes transverse to the side faces to form a structural assembly.

1 Claim, 3 Drawing Sheets

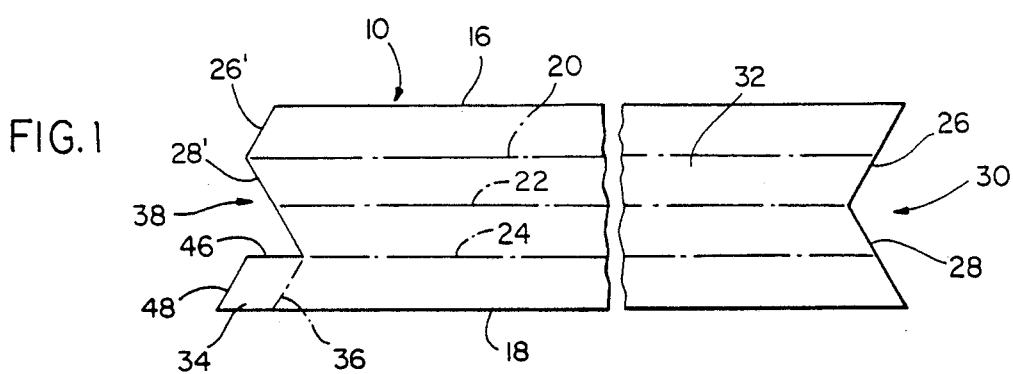
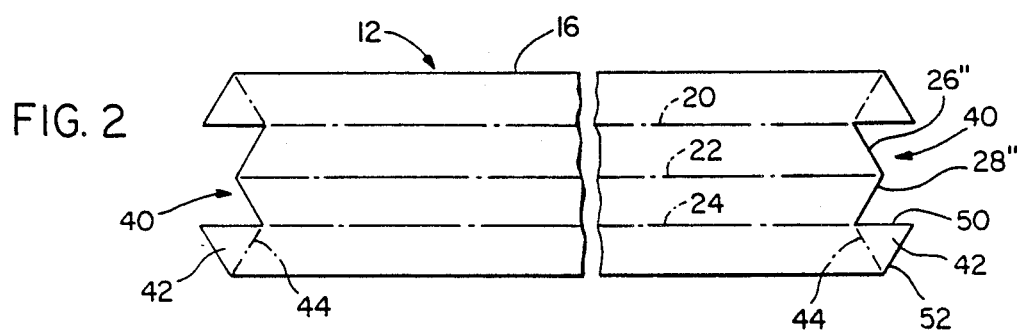
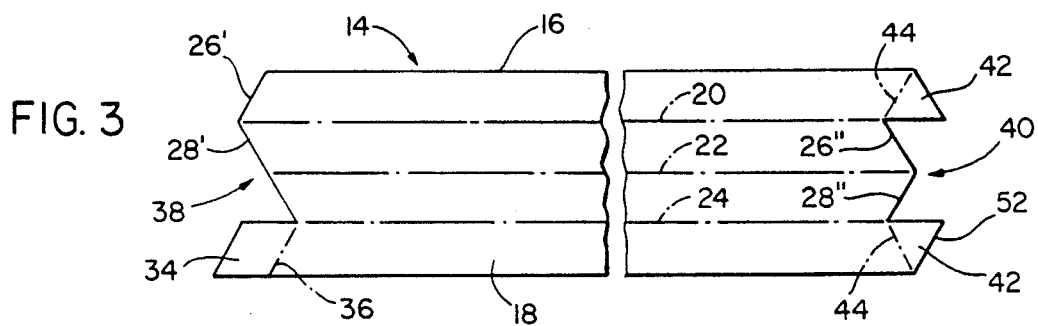
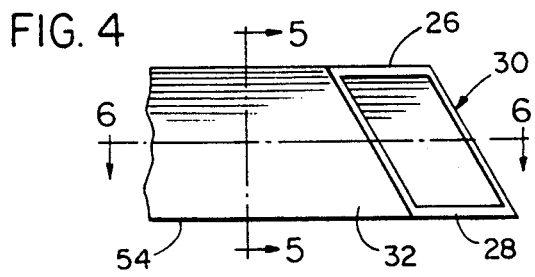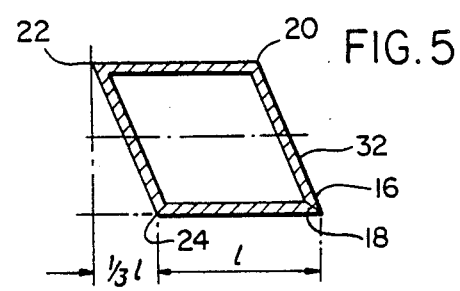
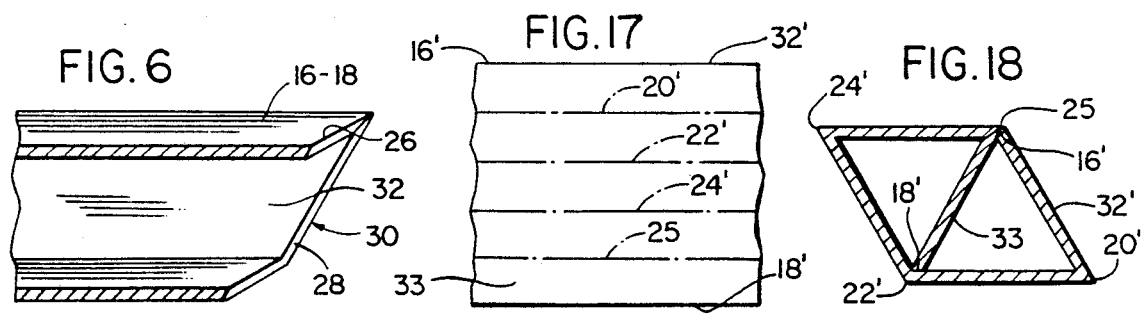

FABRICATED STRUCTURAL TUBE

This application is a continuation of application Ser. No. 045,560 filed May 4, 1987, now abandoned.

BACKGROUND OF THE INVENTION

This invention relates to elongated structural supports of the tubular type and a method of fabricating the same.

Elongated structural members are already known in the art for use in the erection of frame assemblies and various constructions, wherein such structural support members are of tubular cross-section adapted to be fabricated from flat stock material. Quite often, such tubular support members have non-rigid cross sections and are fabricated without any particular attention to the axial ends thereof during the fabricating process, since such ends must be specially cut and/or formed to meet different requirements.

Accordingly, it is an important object of the present invention to provide a tubular support member and a method of fabricating the same which will avoid some of the disadvantages and limitations associated with tubular support members heretofore known.

Another object of the present invention is to provide a method of fabricating tubular support members from flat stock material in such a manner as to avoid structural modification of such support members during assembly and erection of frame assemblies therefrom.

SUMMARY OF THE INVENTION

In accordance with the present invention, flat sheet stock material die cut into a blank is folded along laterally spaced fold lines thereon in a folding operation until the longitudinal marginal edges of the stock material abut and form a tubular cross-section with planar side faces between the fold lines. Prior to such folding of the material, the opposite longitudinal ends of the blank are die cut in accordance with one of three different configurations, some of which include flaps that are foldable into enclosing walls as part of the folding operation aforementioned. All of the die cut blanks at the opposite ends include two end edges extending at an angle to each other from at least one of the longitudinal fold lines terminating two of the side faces separated by such fold line. The end wall closing flaps are folded into abutment with such end edges to form end formations at the opposite ends of the folded blanks. All abutting edges are bonded to each other upon completion of a folding operation in order to form each tubular support with a relatively rigid polygonal cross-section as well as one of at least three different end formations at each of the opposite ends of the tubular support. Such end formations are such as to enable interconnection of different tubular supports with each other in abutment at their end formations thereby aligning all side faces in a common plane.

In accordance with a preferred embodiment of the invention, the polygonal cross-section of the tubular structural supports are in the form of parallelograms. Accordingly, each tubular support is formed from a blank of flat sheet material having its longitudinal marginal edges extending in parallel spaced relationship to each other between opposite ends. The opposite ends of the blank are die cut so that the aforementioned end edges extend at an angle to each other, bisected by a fold line from which the end edges extend. Some of the end configurations have foldable flaps extending from one of the side faces formed between a marginal edge and a fold line parallel thereto. Either a single parallelogram flap or two triangular flaps are formed at one end of the blank. The flaps when folded abut the end edges to form closing walls associated with two different types of end formations. In one end formation, a single wall closing flap is disposed in a single abutment plane transverse to the longitudinal side faces. In the other of the end formations having two wall closing flaps, the flaps abut each other at the intersection of two abutment planes at an angle to each other. A third type of end formation has no closing wall at all with the end edges aligned in a single transverse plane at which all of the side faces terminate. Tubular supports constructed in accordance with the aforementioned preferred embodiment may be interconnected at their end formations with the end walls abutting each other. Either two or three groups of such tubular supports are interconnected at their end formations. Where two tubular supports are interconnected, two identical end formations are in abutment. Where three tubular supports are interconnected at their end formations, two of the end formations are of the same type while the third is a different type. The interconnection of the tubular supports in such a manner form parallelogram frame assemblies with opposed side faces of the tubular supports aligned in common parallel planes.

BRIEF DESCRIPTION OF THE DRAWING FIGURES

The foregoing objects, features and advantages of the invention, as well as others, will become apparent from the following detailed description given by way of example to be read in connection with the accompanying drawings, wherein:

FIG. 1 is a plan view of a flat blank of stock material die cut in accordance with the present invention and from which one type of tubular support member is fabricated.

FIG. 2 is a plan view of another blank of stock material from which another type of tubular support is fabricated in accordance with the present invention.

FIG. 3 is a plan view of yet a third die cut blank of stock material from which a third type of tubular support is fabricated in accordance with the present invention.

FIG. 4 is a partial side elevation view at one end of a tubular support fabricated from the stock material blank as shown in FIG. 1.

FIGS. 5 and 6 are sectional views taken substantially through planes indicated by section lines 5—5 and 6—6 in FIG. 4.

Figure 7:
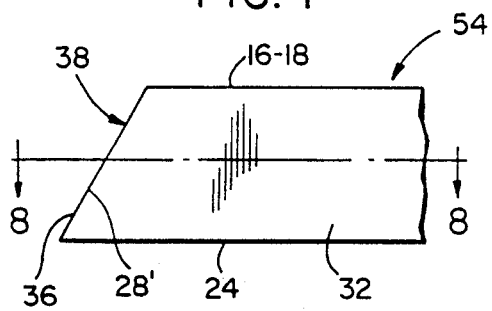

FIG. 7 is a partial side elevation view of a tubular support at another end, fabricated from a stock material blank as shown in FIG. 1.

Figure 8:
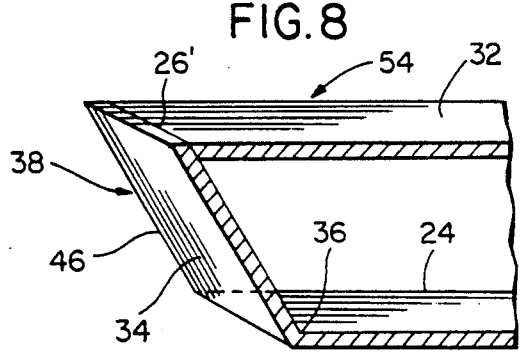

FIG. 8 is a sectional view taken substantially through a plane indicated by section line 8—8 of FIG. 7.

Figure 9:
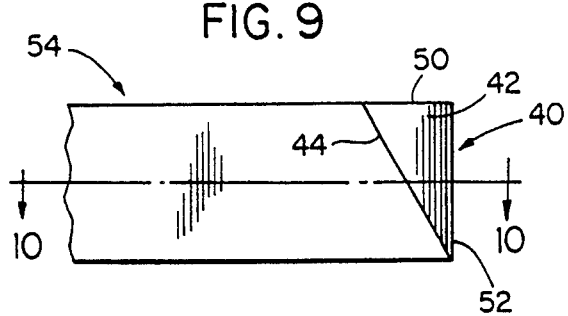

FIG. 9 is a partial side elevation view of a tubular support fabricated from a die cut blank as shown in FIGS. 2 or 3 at one axial end.

Figure 10:
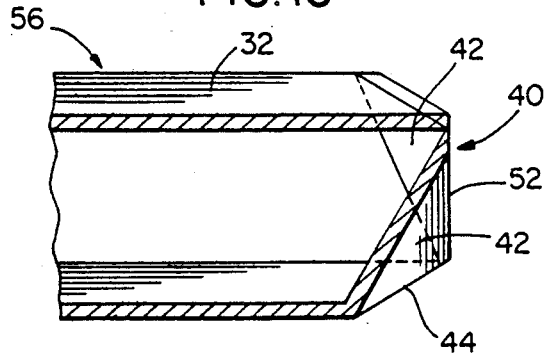

FIG. 10 is a sectional view taken substantially through a plane indicated by section line 10—10 in FIG. 9.

Figure 11:
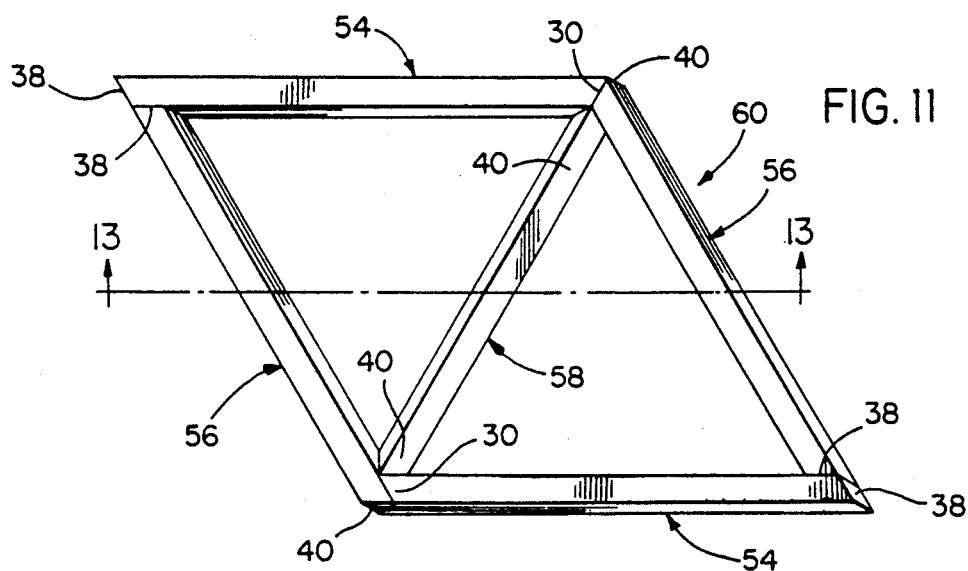

FIG. 11 is an plan view of a unit frame assembly formed by the interconnection of the tubular supports constructed in accordance with the present invention.

Figure 12:
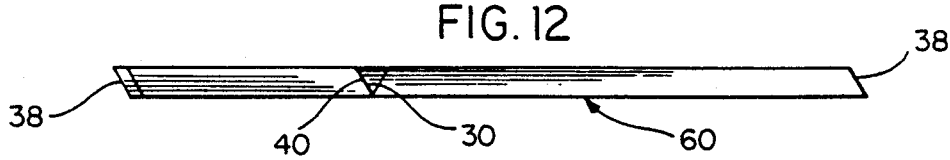

FIG. 12 is an end view of the frame assembly shown in FIG. 11.

Figure 13:
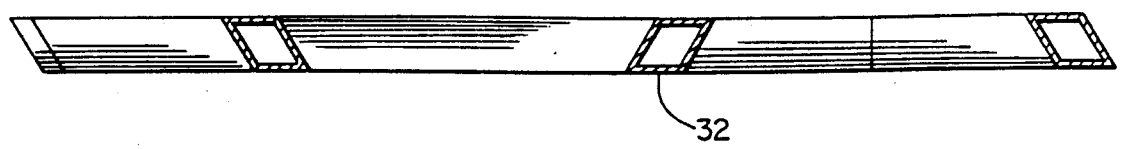

FIG. 13 is a sectional view taken substantially through a plane indicated by section line 13—13 in FIG. 11.

Figure 14:
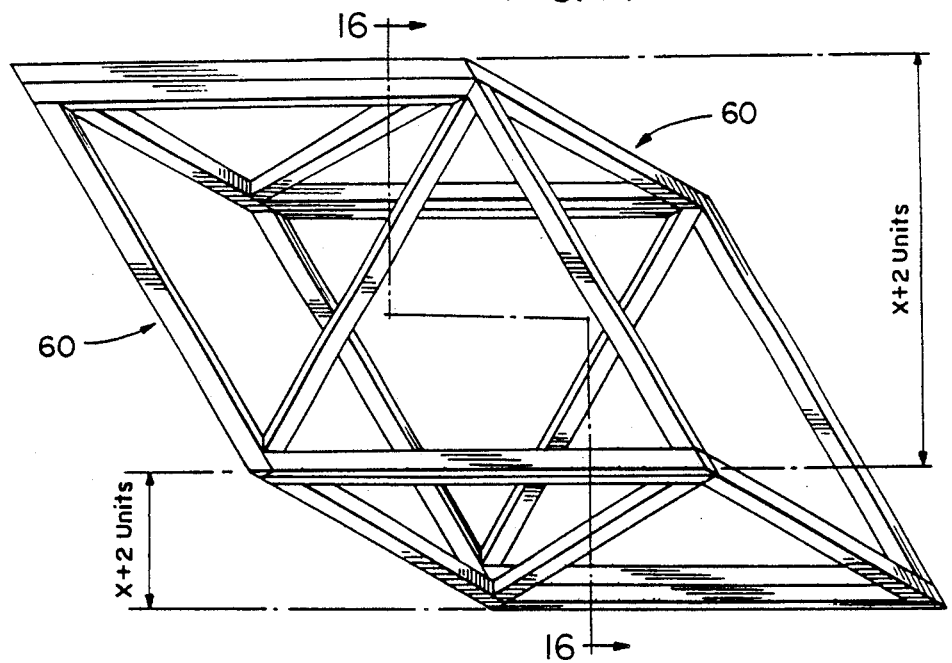

FIG. 14 is a plan view of a three-dimensional frame assembly formed by the interconnection of unit frame assemblies as shown in FIG. 11.

Figure 15:
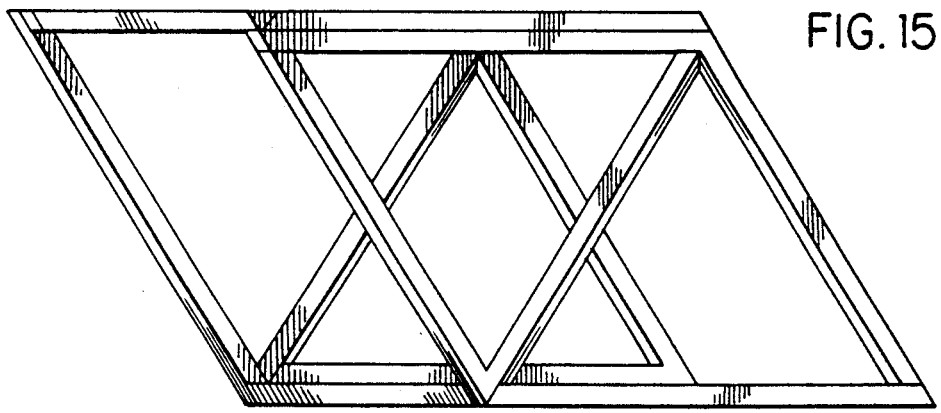

FIG. 15 is an elevation view of the assembly shown in FIG. 14.

Figure 16:
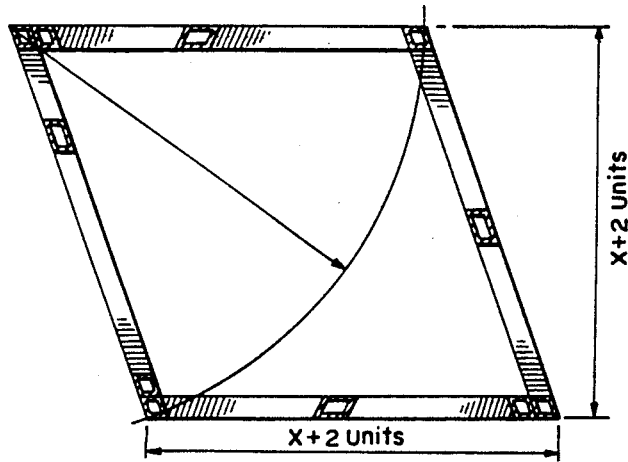

FIG. 16 is a section view taken substantially through a plane indicated by section line 16—16 in FIG. 14.

FIG. 17 is a partial plan view of a flat blank from which a tubular support is folded in accordance with another embodiment of the invention.

FIG. 18 is a transverse section view of a tubular support constructed in accordance with the embodiment of FIG. 17.

DETAILED DESCRIPTION OF THE PREFERRED EMBODIMENT

In accordance with one embodiment of the invention, tubular structural support members are fabricated from flat stock material, such as sheet metal, which may be unrolled for example from a storage roll and die cut into three different blanks 10, 12 and 14 as respectively illustrated in FIGS. 1, 2 and 3. Each die cut blank 10, 12 and 14 is similar in that it has parallel spaced marginal edges 16 and 18 which extend between opposite ends at which different end formations are established. Three equally spaced, parallel fold lines 20, 22 and 24 are established on each blank along which the blank is to be folded.

The flat sheet material blank 10 as shown in FIG. 1 is die cut at one longitudinal end to form two end edges 26 and 28 from which one type of end formation 30 is established as will be described hereinafter. The end edges 26 and 28 terminate planar side panel faces 32 formed between the parallel-spaced fold lines and the marginal edges 16 and 18. Furthermore, the end edges 26 and 28 extend from the fold line 22 at an external angle of 120° to each other with the fold line 22 bisecting such angle.

The opposite longitudinal end of the die cut blank 10 as shown in FIG. 1, is formed with end edges 26' and 28'. The end edges 26' and 28' extend at an external angle of 240° to each other, bisected by the fold line 20. Whereas each of the end edges 26 and 28 aforementioned respectively extend transversely of and terminate two planar side faces 32, the end edge 26' terminates a single side face while the end edge 28' terminates two side faces. A foldable end wall closing flap 34 extends from the fourth end face formed between the marginal edge 18 and fold line 24. The flap 34 is in the shape of an equilateral parallelogram adapted to be folded along the fold line 36 at which the side face terminates. One corner of the flap 34 is coincident with the intersection of the side edge 28' and the fold line 24. It will also be apparent from FIG. 1 that all of the fold lines intersect the end edges at the opposite ends corresponding to the 60° acute angles at the opposed corners of the parallelogram flap 34. Further, the longitudinal length of each die cut blank will be a multiple of the length of the sides of the equilateral parallelogram flap 34. The die cut end of the blank 10 having the end edges 26' and 28' and the flap 34, form an end formation 38 on the tubular support as will be explained hereinafter.

The tubular support formed from the die cut blank 12 shown in FIG. 2, differs from the die cut blank 10 of FIG. 1 in that the opposite axial ends are configured to form similar end formations 40 which are different from the end formations 30 and 38 hereinbefore described with respect to FIG. 1. Each end formation 40 as shown in FIG. 2, includes first and second end edges 26" and 28" extending from first and second side panel faces at an angle from the fold line 22 toward the fold lines 20 and 24. Two end wall closing flaps 42 project from third and fourth of the side faces formed between the marginal edges 16 and 18 and the fold lines 20 and 24. The flaps 42 are folded into first and second abutment planes transverse to their third and fourth of the side faces along fold lines 44 and are in the shape of equilateral triangles.

The flat, die cut blank 14 shown in FIG. 3, differs from the blanks 10 and 12 in that the opposite longitudinal ends thereof are respectively configured to form end formation 38 associated with the left end of the blank 10 shown in FIG. 1 and end formation 40 associated with the right end of the blank 12 shown in FIG. 2.

The first basic step in forming a tubular support in accordance with the present invention is the die cutting of the blanks 10, 12 and 14 from the flat stock material as hereinbefore described with respect to FIGS. 1, 2 and 3. The folding operation is then performed resulting in abutment of the marginal edges 16 and 18 of the stock material, abutment of the edges 46 and 48 on the flap 34 with the end edges, abutment of edges 50 on the triangular flaps 42 with the first and second end edges 26" and 28" and abutment of edges 52 with each other to form the intersection of the first and second abutment planes in which the external surfaces of the folded flaps 42 lie, as shown in FIGS. 9 and 10. The abutting edges are then bonded to each other as by welding to complete formation of the tubular support.

During the folding operation, the blanks are folded, as by crimping, along the three fold lines 20, 22 and 24 until the marginal edges 16 and 18 abut to form a polygonal cross-section. In the illustrated embodiment, such polygonal cross-section is in the form of an equilateral parallelogram as more clearly seen in FIG. 5. The abutting edges 16 and 18 when bonded to each other form a tubular support with the side faces 32 thereof being of equal width in the illustrated embodiment. Further, adjacent side faces are disposed at an angle to each other. The angular disposition of the side faces relative to each other in the illustrated embodiment may be determined by the acute angle of a right triangle having a hypotenuse equal to the unit length (L) of one side of the cross-section or width of side face 32 and a base equal to $\frac{1}{3}$ of such unit length as shown in FIG. 5.

Referring now to FIGS. 1, 4 and 6, it will be noted that folding of the blank 10 and bonding of its marginal edges 16 and 18 will form a tubular support generally referred to by reference 54 having the end formation 30 at one longitudinal end. The end formation 30 is formed entirely by the end edges 26 and 28 disposed in a common abutment plane transverse to the side faces 32 and at an angle thereto.

FIGS. 7 and 8 illustrate the end portion of tubular support 54 at which the formation 38 is established. The end formation 38, as in the case of the end formation 30, is disposed generally in a single abutment plane at an angle to the side faces 32. However, the end edges 26' and 28' at the end formation 38 are bonded to the abutting edges 46 and 48 of the end wall closing flap 34 as aforementioned.

The end formation 38 is also formed at one end of a tubular support 56 as shown in FIGS. 9 and 10. The tubular support 56 is formed from the blank 14 shown in FIG. 3 having the end formation 40 at the right end thereof. The flaps 42 associated with the end formation 40 are folded so that the edges 52 thereof abut each other while the other edges 50 thereof abut the end edges 26" and 28" as aforementioned. Thus, the end wall closing flaps 42 are disposed in transverse planes at an angle to each other intersecting at the abutting edges 52.

A third type of tubular support 58 corresponding to the blank 12 shown in FIG. 2, has similar end formations 40 at opposite ends. Such third type of tubular support 58 is shown in FIG. 11.

FIGS. 11, 12 and 13 show a pre-assembled panel generally referred to by reference numeral 60 in the general shape of an equilateral parallelogram, the opposed sides of which are formed by two tubular supports 54 and two tubular supports 56. The parallelogram panel structure is braced by an intermediate support 58 having opposite end formations 40 of the same type. The end formations 40 of the intermediate bracing support 58, abut the end formations 30 and 40 on ends of tubular supports 54 and 56 at which opposed obtuse angles of the parallelogram are located. Abutment of the end formations 38 of the tubular supports 54 and 56 also form the opposed acute angle corners of the parallelogram configuration.

With the end formations 30, 38 and 40 abutting as shown in FIG. 11, the tubular supports are interconnected by bonding of the abutting surfaces. When in abutment, the tubular supports will have opposed side faces thereof aligned in common parallel spaced planes as shown in FIG. 12 so that the panel 60 may be properly positioned and readily interconnected with larger structures.

By way of example, FIGS. 14, 15 and 16 illustrate four panel assemblies 60 assembled and interconnected to form a three-dimensional rhomboid structure. Other more complex structures may be similarly formed by such panel assemblies. In the assembly shown in FIGS. 14, 15 and 16, the panel assemblies 60 abut and are interconnected along the length of adjacent tubular members from which the panel assemblies 60 extend at right angles to each other. Thus, relatively complex but rigid structures may be formed utilizing the tubular supports 54, 56 and 58 as hereinbefore described. It should, however, be appreciated that three-dimensional structures may also be assembled from the tubular supports without pre-assembly into panels, thereby eliminating redundancy of some tubular supports.

In accordance with another embodiment of the invention, a more stable cross-section for the tubular supports may be obtained from blanks folded along four fold lines, 20', 22', 24', and 25 as shown in FIG. 17. The cross-section of such tubular support as shown in FIG. 18 includes four external side faces 32' to form a parallelogram as hereinbefore described and a fifth side panel 33 folded inside to triangulate the cross-section. Accordingly, marginal edge 16' will abut and be bonded at the parallelogram corner formed at fold line 25 while the other marginal edge 18' will abut and be bonded inside the tube at the corner formed at fold line 22'.

While the embodiment of the tubular supports described form equilateral parallelograms in cross-section, it should be appreciated that the present invention encompasses parallelogram cross-sections with adjacent side faces of unequal widths. Although such cross-sectional modification would somewhat affect the end configurations of the tubular supports, the end configurations and the side face dimensions would be determined by the same triangular geometry considerations for the tubular supports as hereinbefore described.

It should be understood that various other changes and modifications may be resorted to without departing from the spirit and scope of the invention as defined in the appended claims.

What is claimed is:

1. An elongated structural support having an axial end formation, comprising a sheet material member having marginal edges bonded to each other and a plurality of planar side faces between said marginal edges cross-sectionally defining a polygon, two of said side faces respectively terminating at angularly related end edges aligned respectively with first and second planes transverse to said plurality of the side faces at the axial end formation, said axial end formation including a first end wall formed integral with an extending in folded relation to a third of said plurality of the side faces, said first end wall abutting a first of said end edges substantially in said first of the planes, said axial end formation further including a second end wall formed integral with and extending in folded relation to a fourth of said plurality of the side faces, said second end wall abutting a second of the end edges substantially in the second of the planes transverse to said plurality of the side faces, the first and second end walls abutting each other substantially at an intersection of the first and the second planes.

* * * * *